United States Patent Office 3,384,552
Patented May 21, 1968

3,384,552
DRY SOLID PROTEOLYTIC ENZYME ISOLATED FROM PINGUINAIN
Efrain Toro-Goyco and Milton L. Matos, Rio Piedras, Puerto Rico, assignors to the United States of America as represented by the Secretary of the Army
Filed June 21, 1965, Ser. No. 465,808
9 Claims. (Cl. 195—62)

ABSTRACT OF THE DISCLOSURE

This invention relates to process for purifying crude pinguinain and more particularly to a process for isolating pure pinguinain from inactive proteinaceous material and carbohydrates normally associated therewith. The process including an acetone precipitation of the raw enzyme, isolation of the enzyme by lyophilizing a water solution thereof, and separation through the use of "gel filtration."

---

The invention described herein may be manufactured and used by or for the Government for governmental purposes without the payment to us of any royalty thereon.

BACKGROUND OF THE INVENTION

1. Field of the invention

This invention relates to the isolation of the pure proteolytic enzyme pinguinain, a monomer thereof, and the process for isolation.

2. Description of the prior art

The proteolytic enzyme pinguinain occurs in large quantities in the juice of a variety of plants of which the Cuban variety of *Bromelia pinguin* L. is exemplary. This enzyme has a variety of industrial uses of which dehairing hides and meat tenderizing are representative. In addition pinguinain has uses in the medical field in such diverse areas as clot lysis, as a collagenase, a fibrinolytic agent, and in the recovery of parasitic ova from infected tissue as described in the copending application of Toro-Goyco et al., Ser. No. 398,456, filed Sept. 22, 1964, now U.S. Patent No. 3,360,438. Crude pinguinain recovered from the juice of *Bromelia pinguin* by filtration and drying of the juice or by the process described in U.S. Patent No. 2,977,287, Mar. 28, 1961 to Block et al., contains in addition to the enzyme itself carbohydrate and protein materials. These impurities are undesirable, particularly when the enzyme is to be used as an anti-inflammatory agent by parenteral administration. The separation of the carbohydrate fraction is not as difficult as the isolation of the proteolytically active protein fraction from the non-proteolytic proteins naturally associated therewith.

SUMMARY OF THE INVENTION

It has been discovered that the protein fraction of the crude enzyme is a mixture of two macromolecules, only one of which shows proteolytic activity, and low molecular weight peptides and amino acids and that these fractions can be resolved through a "gel filtration" to yield only the proteolytic pinguinain macromolecule in its pure form.

It is accordingly one object of this invention to isolate and recover the proteolytically active protein fraction of crude pinguinain.

It is another object of this invention to recover pure pinguinain from the juice of plants containing pinguinain.

It is a further object of this invention to isolate pure pinguinain by a gel filtration technique.

It is also an object of this invention to fractionate and purify the enzyme present in the Puerto Rican variety of the fruit *Bromelia pinguin* L.

DESCRIPTION OF THE DRAWINGS

These and other objects of the invention will be obvious from the following description with reference to the accompanying drawings wherein.

DESCRIPTION OF THE PREFERRED EMBODIMENT

Figure 1:
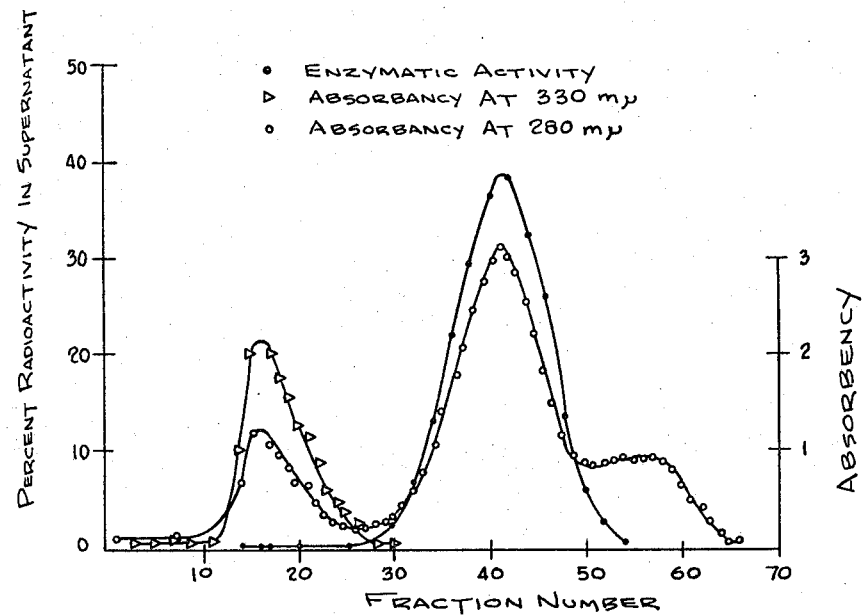
FIG. 1 depicts enzymatic activity, —●—; the absorbency at 330 millimicrons (hereinafter referred to as m$\mu$), —△—, the absorbency at 280 m$\mu$, —o—, of the product of the gel filtration process of separation of pinguinain in relation to the fractions collected.

The run was performed at 59,780 r.p.m. Direction of migration is from left to right. The drawing represents a picture taken 80 minutes after obtaining full speed. The heavy black line thereon is formed by a beam of light from a radially oriented slit passed vertically through the rotating cell, and thereby forming said line by exposing a photographic plate. The peak represents a boundary region between the macromolecules moving to the periphery of the cell and the solvent. Said peak is formed due to the refraction of light as it passes through said boundary region. The heavy black line then represents a refractory index gradient and hence the concentration gradient projected on a horizontal plane passed through the rotating cell.

The juice was extracted from the Puerto Rican variety of the fruit by squeezing the pulp in a cheese cloth. The debris was then removed by centrifugation. Macromolecular constituents were concentrated as follows: The pH of the juice (normally between 3 and 4) was brought to 7.2 with 1.0 molar (hereinafter referred to as M) NaOH after the addition of 3 grams of cysteine per liter of juice. A dark precipitate was formed which contained high molecular weight impurities, mainly carbohydrates. This mixture was centrifuged and the precipitate discarded. The supernatant was then brought to 0° C.

Acetone was added until the proportion of acetone to juice was 2:1. A precipitate was then formed which consisted of the bulk of the enzymatic activity. This precipitate was allowed to settle, centrifuged in the cold, and the supernatant discarded. The precipitate was redissolved in distilled water, and lyophilized. The precipitate was then passed through a gel filtration column.

The "gel filtration" was achieved through the use of a "Sephadex G–100" (particle size 140–400 mesh) gel column. Sephadex gel is a dextran gel prepared by cross linking dextran in such a way that the polysaccharide chains form a macromolecular network. See Porath and Flodin, 183 Nature 1657 (1959). When the trade name "Sephadex" is used hereinafter, it will be used to indicate a dextran gel. Sephadex G–100 gel was prepared by dissolving the dry gel in distilled water. The gel had beads of 40–120 microns (hereinafter referred to as $\mu$) and a water regain of 10±1 g. H$_2$O/g. dry gel. After allowing the gel to swell for 12 hours and repeated washing to eliminate small beads that might reduce the efficacy of the gel, the gel suspension was slurried into a cylindrical glass tube, prepared as follows: The glass tube had an internal diameter of 5 cm. and a length of 65 cm. At the bottom of the tube a one-holed rubber stopper (#10) is inserted. A cylindrical glass tube 4 cm. long with an internal diameter of 1 cm. was introduced through the hole. This latter tube in turn was connected to a stopcock to regulate the flow of liquid. The rubber stopper and hence the 1 cm. hole was covered with a layer of glass wool to prevent the outflowing of gel when added to the cylindrical tube, but which would allow the passage of fluid.

Enough gel was slurried into the cylindrical tube to occupy a bed volume of 880 ml. (a length of gel column of about 45 cm.). The column was then washed with 0.1 M acetate buffer of a pH of 4.6 until the buffer replaced the water and the eluted liquid had the same pH as the buffer. The excess buffer was then removed from the top of the column.

Two to three grams of the lyophilized powder, suspended in 100 milliliters (hereinafter referred to as ml.) of .1 M acetate buffer (pH 4.6) was introduced into the top of the column. As the last of the suspension passed into the gel, buffer was added at the top to wash the gel. Excess buffer was added and the filtration was allowed to proceed under a hydrostatic pressure of 20 cm. A bottle of buffer was kept on top of the column, so that the rate of outflow of buffer from the column was compensated by an equal flow into the column.

The rate of flow through the column was 30 ml. per hour. The elution volume was collected in 2 ml. samples with the aid of an automatic fraction collector.

Aliquots of the fractions were then assayed qualitatively for protein with a 40 percent solution of trichloroacetic acid, and for enzymatic activity.

Protein contents were determined by measuring the absorption at 280 m$\mu$ in a Beckman DU Spectrophotometer.

The enzymatic activity was measured through a modification of the method of Northrop (J. Gen. Physiology 16: 41: 313, 1932). A solution of 40 percent trichloroacetic acid was used and protein radioactivity (as radioiodinated protein) was converted to trichloroacetic acid soluble radioactivity and measured. Iodine #131 used as a tracer was therefore an index of protein hydrolysis. Analysis was conducted using a substrate of a 2 percent solution of human albumin (40 mg. of albumin) in acetate buffer of pH 4.0. Samples were assayed for radioactivity in a well scintillation counter.

Experimental data indicate the presence of two macromolecules (FIG. 1). One component was not precipitated by trichloroacetic acid, but appeared with the void volume indicating a very high molecular weight. This component was not rendered insoluble by heat, and did not show enzymatic activity. Althougth absorbing at 280 m$\mu$, its absorbing maximum occurred at 330 m$\mu$.

The most abundant macromolecule showed the properties of a protein; showed absorption at 280 m$\mu$; did not absorb at 330 m$\mu$; was rendered insoluble by heat; was precipitated by trichloroacetic acid and showed enzymatic activity proportional to protein concentration.

A third peak obtained contained low molecular weight peptides and amino acids, but showed no enzymatic activity.

The chart (FIG. 1) discloses that as a result of gel filtration, the aliquot (2 ml.) portions can be divided into three groups. The central peak, on the basis of absorbency at 280 m$\mu$, is the only group exhibiting enzymatic activity. It has been discovered that those fractions containing protein and free of high molecular weight impurities can be detected by addition of 5 drops of 5 M NaOH to an aliquot of the fraction. If impurities are present the solution turns yellow.

Figure 2:
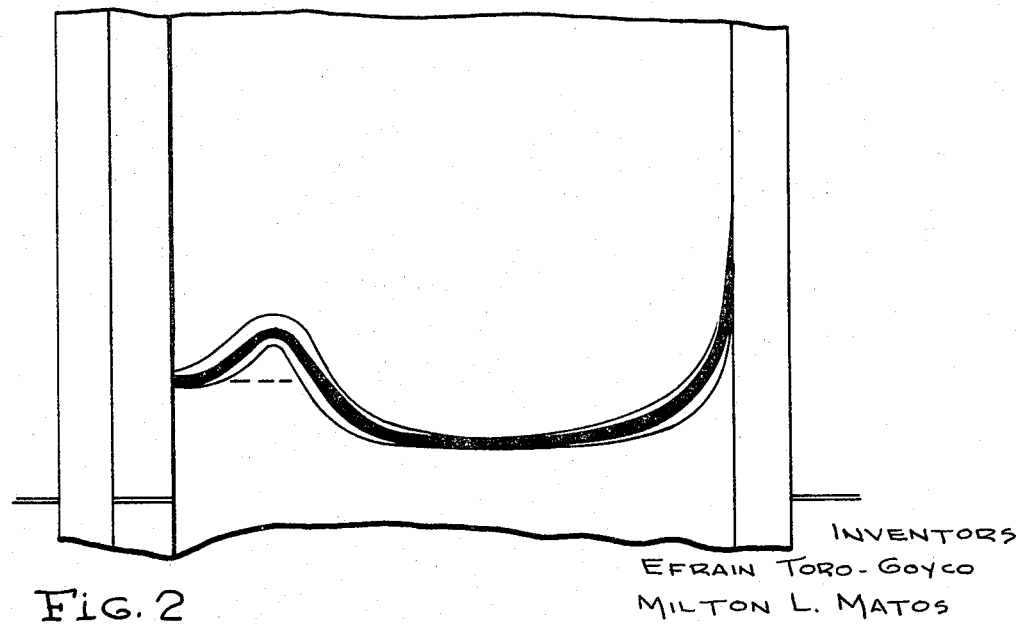
FIG. 2 is a representation of the ultracentrifuge pattern of purified pinguinain (aliquots corresponding to the enzymatic activity peak of FIG. 1).

The most abundant macromolecule migrates as a single component in paper electrophoresis in .05 M acetate buffer (pH=4.6). Ultracentrifugal analysis (FIG. 2) of this component performed in a Spinco Model E. Ultracentrifuge at 59,780 r.p.m. using 0.1 M phosphate buffer pH 7.3 as a solvent showed a single component with a sedimentary coefficient ($S_{20,w}$) of $2.1 \times 10^{-13}$ seconds. The diffusion coefficient ($D_{20,w}$) calculated for this purified preparation from steady state diffusion experiments using a Northrop-Anson cell was $14 \pm 1.0$ cm.$^2$ seconds $^{-1}$. The calculated partial specific volume for purified pinguinain was 0.746 ml./g. On the basis of these data and the equation disclosed in Svedberg and Pederson, The Ultracentrifuge, Clarendon Press, Oxford, 1940, a molecular weight of $14,700 \pm 1000$ was calculated.

Further experimental evaluation of the middle fraction to determine the properties of the activated enzyme isolated was conducted through dialysis. The pool of aliquots was separated into two dialysis bags (cellulose dialyzer tubing, diameter inflated 1⅛ inches) and dialyzed against 4 liters of a $10^{-4}$ M thioglycolic acid in 4.0 liters distilled water. Dialysis was performed at a temperature of 30–32° F., with continuous stirring to prevent freezing. The dialysis was performed at a temperature of 30–32° F., with continuous stirring to prevent freezing. The dialysis was allowed to proceed for 72 hours, with two changes of the thioglycolic solution daily. Any precipitated material at the end of the dialysis was removed by centrifugation for 5 minutes at 1000 r.p.m.

Upon gel filtration using Sephadex G–200, this protein material appeared to be homogeneous. The dialyzed enzyme solutions were frozen, kept frozen for 2 hours and lyophilized. The lyophilized material was crystalline. Crystalline rods had an average length of 150$\mu$. Gel filtration of the crystalline material showed that the crystallization process causes the appearance of a peptide material which has a molecular weight of 7,000, which is half of the estimated molecular weight for the enzyme. This would seem to suggest that active pinguinain is a dimer, and a partial disintegration of a dimer to a monomer occurs upon crystallization.

The yield from the process results in 1.5 gms. enzyme/100 ml. juice ($\pm 0.1$ g.). This yield was obtained for six different preparations of juice submitted to gel filtration.

The juice was prepared for the gel filtration separation of the pure enzyme from proteinaceous macromolecular and low molecular weight impurities by concentration and elimination of the carbohydrate impurities according to the following alternative methods:

(1) The pulp of the *Bromelia pinguin* fruit was removed and the juice separated by expressing the pulp. The juice was filtered through glass wool and centrifuged for 30 minutes at 3000 r.p.m. to remove any remaining debris. After decanting the juice 3 grams of cysteine per liter of juice were dissolved, and the juice solution cooled to 0° C. 1.0 M NaOH was added dropwise to the juice until the pH is brought to 7.2. The dark precipitate which formed was allowed to settle for 15 minutes, and then was removed by filtration through a Buchner funnel. Acetone was then added to the supernatant to bring the proportion of acetone to juice to a 2:1 ratio. The precipitate formed was allowed to settle for 15 minutes. The mixture of precipitate and supernatant was centrifuged in the cold at 3000 r.p.m. for 10 minutes. The supernatant was then discarded. The precipitate was redissolved in water and lyophilized.

(2) The juice was obtained from the fruit by squeezing the pulp. The pH of the juice was brought to neutral by the addition of 1.0 M NaOH. It was allowed to stand 15 minutes. The dark precipitate, containing cell debris and high molecular weight carbohydrate, was formed and removed by centrifugation at 25,000 r.p.m. for 15 minutes.

The supernatant was removed and brought to the original pH of the juice (pH 3.5–4.0). (This procedure for removal of impurities does not alter the enzymatic activity of the juice.)

One hundred ml. of the juice is then passed through a Sephadex G–100 gel filtration column as previously described with acetate buffer (pH 4.6, 0.1 M) as eluent. A hydrostatic pressure of 20 cm. was maintained during filtration.

We claim:

1. A dry solid material free from associated carbohydrate, macromolecular protein, and low molecular weight peptide and amino acid impurities and comprising a proteolytic enzyme isolated from the juice of the fruit of the Puerto Rican variety of *Bromelia pinguin*, said proteolytic enzyme having a molecular weight of about 14,700, a diffusion coefficient of 14±1.0 cm.$^2$ seconds,$^{-1}$, a sedimentary coefficient of 2.1×10$^{-13}$ seconds, and having an absorption maximum at 280 mμ in a spectrometer.

2. A method for preparing pure pinguinain which comprises the following steps:
 (a) extracting the juice from the fruit of the Puerto Rican variety of *Bromelia pinguin* by pressing said fruit;
 (b) separating the debris from said juice by filtering and centrifuging said filtrate;
 (c) preventing loss of enzymatic activity by dissolving the reducing agent cysteine in said filtrate;
 (d) cooling the solution to 0° C.;
 (e) precipitating carbohydrate impurities by bringing the pH of said solution to neutral;
 (f) filtering said solution through a Buchner funnel;
 (g) precipitating the raw enzyme by adding acetone to the filtrate;
 (h) separating the precipitate by centrifuging in the cold;
 (i) redissolving said precipitate in distilled water;
 (j) isolating the raw enzyme by lyophilizing the water solution; and
 (k) separating the pure enzyme by filtering a suspension of the lyophilized powder in a buffer solution having a pH of about 4.6 through a dextran gel filtration column with said buffer solution as eluent.

3. A method of preparing pure pinguinain which comprises the following steps:
 (a) extracting the juice from the fruit of the Puerto Rican variety of *Bromelia pinguin* by pressing said fruit;
 (b) removing the debris from said juice by centrifugation;
 (c) preventing the loss of enzymatic activity by dissolving the reducing agent cysteine in the supernatant;
 (d) precipitating carbohydrate impurities by bringing the pH of the solution to neutral;
 (e) separating said precipitate by centrifugation;
 (f) cooling the supernatant to 0° C.;
 (g) precipitating the raw enzyme by adding acetone to said supernatant;
 (h) separating the precipitate formed by centrifuging in the cold;
 (i) redissolving said precipitate in distilled water;
 (j) isolating the raw enzyme by lyophilizing the water solution;
 (k) separating the pure enzyme by filtering a suspension of the lyophilized powder in a buffer solution having a pH of about 4.6 through a dextran gel filtration column with said buffer solution as eluent.

4. A method of preparing pure pinguinain which comprises the following steps:
 (a) extracting the juice from the fruit of the Puerto Rican variety of *Bromelia pinguin* by pressing said fruit;
 (b) bringing the pH of said juice to neutral;
 (c) separating the precipitate formed and cell debris present in said juice through centrifugtaion;
 (d) bringing the supernatant to a pH of 3.5 to 4.0;
 (e) separating the pure enzyme from said supernatant by filtration through a dextran gel filtration column using a buffer solution of a pH of about 4.6 as eluent.

5. A method of extracting pure pinguinain from the Puerto Rican variety of *Bromelia pinguin* L. which comprises the following steps:
 (a) extracting juice from said fruit by pressing;
 (b) bringing the pH of said juice to neutral;
 (c) separating the precipitate formed and cell debris present in said juice through centrifugation;
 (d) bringing the supernatant to a pH of 3.5 to 4.0;
 (e) filtering said supernatant through a dextran gel filtration column with a .1 M acetate buffer as eluent, said gel filtration column having a bed volume of about 880 ml., exit flow rate of about 30 ml. per hour, and having a constant hydrostatic pressure of about 20 cm. throughout filtration, said gel having a dry particle size of 140–400 mesh, beads of 40–120μ, and a water regain of 10±1 gram water per gram of dry gel;
 (f) collecting the filtrate in small equal volume aliquots;
 (g) separating the middle fraction of said filtrate on the basis of the enzymatic activity of said aliquots;
 (h) dialyzing said middle fraction against a thioglycolic acid solution and distilled water a temperature of 30–32° F. with stirring;
 (i) filtering said dialyzed enzyme through a dextran gel filtration column;
 (j) collecting the fraction exhibiting enzymatic activity;
 (k) freezing said enzymatic solution; and
 (l) lyophilizing said frozen enzyme crystals.

6. A method of preparing pure pinguinain which comprises the following steps of:
 (a) extracting the juice from the Puerto Rican variety of the fruit *Bromelia pinguin* L. by pressing said fruit;
 (b) removing the debris from the juice by centrifugation;
 (c) dissolving 3 grams of cysteine per liter of juice in said juice;
 (d) bringing the solution to a neutral pH;
 (e) separating the precipitate formed by centrifugation;
 (f) cooling the supernatant to 0° C.;
 (g) adding acetone until the ratio of acetone to juice is 2:1;
 (h) separating the precipitate formed by centrifugation in the cold;
 (i) redissolving the precipitate in distilled water;
 (j) lyophilizing the solution;
 (k) suspending 2–3 grams of the lyophilized powder in 100 ml. of .1 M acetate buffer;
 (l) passing the suspension through a dextran gel filtration column with .1 M acetate buffer as eluent, said gel filtration column having a bed volume of 880 ml., exit flow rate of 30 ml. per hour, and having a constant hydrostatic pressure of 20 cm. throughout filtration; said gel having a dry particle size of 140–120μ, beads of 40–120μ, and a water regain of 10±1 gram water per gram of dry gel;
 (m) collecting the filtrate in small, equal volume aliquots; and
 (n) separating the middle fraction of said filtrate as a pure enzymatic solution on the basis of the enzymatic activity of said aliquots.

7. A method as set forth in claim 6, whereby the pure enzyme solution resulting from step (n) is crystallized, comprising the following steps:
 (a) dialyzing the enzyme solution against a thioglycolic acid solution and distilled water at a temperature of 30–32° F. with stirring;
 (b) filtering said dialyzed enzyme solution through a dextran gel filtration column;
 (c) collecting the fraction exhibiting enzymatic activity;
 (d) freezing said enzymatic solution; and
 (e) lyophilizing the frozen enzyme crystals.

8. A method for preparing pure pinguinain which comprises the following steps;
 (a) extracting the juice from the Puerto Rican variety of the fruit *Bromelia pinguin* L. by pressing said fruit;
 (b) filtering said juice through glass wool;
 (c) centrifuging said juice;
 (d) dissolving 3 grams of cysteine per liter of juice in said juice;
 (e) cooling the solution to 0° C.;
 (f) bringing the pH of the solution to neutral;

(g) filtering the solution through a Büchner funnel;
(h) adding acetone to the solution until the ratio of acetone to juice is 2:1;
(i) separating the precipitate by centrifuging in the cold;
(j) redissolving the precipitate in distilled water;
(k) lyophilizing the water solution of raw enzyme;
(l) suspending 2–3 grams of the lyophilized powder in 100 ml. of .1 M acetate buffer;
(m) passing the suspension through a dextran gel filtration column with .1 M acetate buffer as eluent, said gel filtration column having a bed volume of about 880 ml., exit flow rate of about 30 ml. per hour, and having a constant hydrostatic pressure of about 20 cm. throughout filtration; said gel having a dry particle size of 140–400 mesh, beads of 40–120$\mu$, and a water regain of 10±1 gram water per gram of dry gel;
(n) collecting the filtrate in small, equal volume aliquots; and
(o) separating the middle fraction of said filtrate as a pure enzyme solution on the basis of the enzymatic activity of said aliquots.

9. A method as set forth in claim 8, whereby the pure enzyme solution resulting from step (o) is crystallized, comprising the following steps:
(a) dialyzing the enzyme solution against a thioglycolic acid solution and distilled water at a temperature of 30–32° F. with stirring;
(b) filtering said dialyzed enzyme solution through a dextran gel filtration column;
(c) collecting the fraction exhibiting enzymatic activity;
(d) freezing said enzymatic solution; and
(e) lyophilizing the frozen enzyme crystals.

References Cited
UNITED STATES PATENTS 3,019,171   1/1962   Bloch et al. _____ 195—68

OTHER REFERENCES

Murachi et al., Biochemistry, vol. 3, No. 1, January 1964, pp. 48–55.

Toro-Goyco et al., Proceedings Federation of the American Society for Experimental Biology 1963, p. 528. Abstract No. 2195.

LIONEL M. SHAPIRO, *Primary Examiner.*